United States Patent
Lee

(10) Patent No.: US 8,606,269 B2
(45) Date of Patent: Dec. 10, 2013

(54) APPARATUS AND METHOD FOR PROVIDING IDENTIFICATION INFORMATION OF SMALL BASE STATION IN WIRELESS COMMUNICATION SYSTEM

(75) Inventor: Mi-Hyun Lee, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 119 days.

(21) Appl. No.: 13/191,250

(22) Filed: Jul. 26, 2011

(65) Prior Publication Data

US 2012/0021742 A1  Jan. 26, 2012

(30) Foreign Application Priority Data

Jul. 26, 2010  (KR) .................. 10-2010-0071941

(51) Int. Cl.
*H04W 4/00* (2009.01)

(52) U.S. Cl.
USPC ........ 455/434; 455/444; 455/67.11; 455/423; 455/446; 455/455; 370/328

(58) Field of Classification Search
USPC .......... 455/423, 426.1, 426.2, 446, 450, 455, 455/464, 444, 67.11; 370/328–338
See application file for complete search history.

(56) References Cited

U.S. PATENT DOCUMENTS

| | | | |
|---|---|---|---|
| 2010/0136996 A1* | 6/2010 | Han et al. | 455/452.1 |
| 2010/0165942 A1* | 7/2010 | Liao et al. | 370/329 |
| 2011/0044244 A1* | 2/2011 | Etemad | 370/328 |
| 2011/0044268 A1* | 2/2011 | Choi et al. | 370/329 |

* cited by examiner

*Primary Examiner* — Mahendra Patel
*Assistant Examiner* — Quan M Hua

(57) ABSTRACT

An apparatus and method select a segment for providing identification information of a small base station (BS) in a wireless communication system. A signal quality of each of a plurality of segments is determined. When at least one segment is not used by a macro BS, a segment of the worst signal quality is selected among the at least one segment that is not used by a macro BS. And the identification information is transmitted using the selected segment. The selected segment represents a resource for transmitting the identification information.

20 Claims, 7 Drawing Sheets

APPARATUS AND METHOD FOR PROVIDING IDENTIFICATION INFORMATION OF SMALL BASE STATION IN WIRELESS COMMUNICATION SYSTEM

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Jul. 26, 2010 and assigned Serial No. 10-2010-0071941, the contents of which are herein incorporated by reference.

TECHNICAL FIELD OF THE INVENTION

The present invention relates to an apparatus and method for providing identification information of a small base station (BS) in a wireless communication system. More particularly, the present invention relates to an apparatus and method for providing identification information of a low output small BS in a heterogeneous network.

BACKGROUND OF THE INVENTION

Wireless communication systems are developing to provide users with various services such as broadcasting a multimedia video, a multimedia message, and such. Particularly, next-generation wireless communication systems are developing to provide a data service of 100 Megabits per second (Mbps) or more to users who move at high speed, and provide a data service of one ('1') Gigabit per second (Gbps) or more to users who move at low speed.

To satisfy a wireless service demand amount for providing various services, a method for increasing not only a user data service capacity but also a network service capacity is needed. Accordingly, to increase the network service capacity, the wireless communication system can construct a heterogeneous network using a low output small BS. For instance, a heterogeneous network using a low output pico cell, femto cell, and relay station (RS) is constructed as illustrated in FIG. 1 below.

FIG. 1 illustrates a construction of a heterogeneous network according to the conventional art.

As illustrated in FIG. 1, pico BSs 110 and 120, a femto BS 130, and an RS 140 are installed within a macro cell managed by a macro BS 100.

Pico cells managed by the pico BSs 110 and 120 can be installed within a hot zone where there are many data service requests. A femto cell managed by the femto BS 130 can be installed in an indoor office or a home. The RS 140 can be installed for use of supplementing a service area of the macro cell.

The heterogeneous network constructed as above can enhance a network capacity at low cost because a plurality of small BSs form a small scale cell and reuse resources.

A mobile station (MS) of a wireless communication system selects a serving cell based on a reception quality of a cell identification signal. Due to interference caused by a signal of a high output macro BS, there is a problem in that the MS has difficulty selecting a low output small BS. That is, the MS can select a small BS only in a restricted area where a signal strength of the small BS is superior to a signal strength of a macro BS. Accordingly, a service area of the small BS decreases to the restricted area where the signal strength of the small BS is superior to the signal strength of the macro BS, so a gain following the introduction of the small BS is reduced.

SUMMARY OF THE INVENTION

To address the above-discussed deficiencies of the prior art, it is a primary object to provide at least the advantages below. Accordingly, one aspect of the present invention is to provide an apparatus and method for transmitting identification information of a base station (BS) in a heterogeneous network.

Another aspect of the present invention is to provide an apparatus and method for transmitting identification information of a small BS in a heterogeneous network.

Another aspect of the present invention is to provide an apparatus and method for transmitting identification information of a small BS using a resource that is different from a resource used for a macro BS to transmit identification information in a heterogeneous network.

Yet another aspect of the present invention is to provide an apparatus and method for determining a resource for transmitting identification information of a small BS, in consideration of a resource used for a macro BS to transmit identification information in a heterogeneous network.

The above aspects are achieved by providing an apparatus and method for providing identification information of a small BS in a wireless communication system.

According to one aspect of the present invention, a method for transmitting identification information in a small BS of a heterogeneous network is provided. A signal quality of each of a plurality of segments is determined. When at least one segment is not used by a macro BS, a segment of the worst signal quality is selected among the at least one segment that is not used by a macro BS. And the identification information is transmitted using the selected segment. The selected segment represents a resource for transmitting the identification information.

According to another aspect of the present invention, an apparatus of a small BS for transmitting identification information in a heterogeneous network is provided. The apparatus includes a receiver, a signal quality determiner, a segment selector, and a transmitter. The receiver receives a signal. The signal quality determiner determines a signal quality of each of a plurality of segments of the received signal. When at least one segment is not used by a macro BS among the plurality of segments, the segment selector selects a segment of the worst signal quality among the at least one segment. The transmitter transmits the identification information using the selected segment. The selected segment represents a resource for transmitting the identification information.

According to a further aspect of the present invention, a method for selecting a serving cell in a mobile station (MS) of a heterogeneous network is provided. A representative BS that has the best signal quality is determined in each of a plurality of segments. The types of the representative BSs of the respective segments are determined. When at least two representative BSs are of different types, a signal quality difference between the representative BSs of different types is determined. And, when the signal quality difference between the representative BSs of different types is less than a reference value, a small BS is selected.

According to a yet another aspect of the present invention, an apparatus for selecting a serving cell in an MS of a heterogeneous network is provided. The apparatus includes a receiver and a BS selector. The receiver receives a signal. The BS selector determines a representative BS that has the best signal quality in each of a plurality of segments of the received signal. When at least two representative BSs are of different types, the BS selector determines a signal quality difference between the representative BSs of different types. And when the signal quality difference between the representative BSs of different types is less than a reference value, the BS selector selects a small BS.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE INVENTION

FIGS. 2 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Embodiments of the present invention will be described herein below with reference to the accompanying drawings. In the following description, well-known functions or constructions are not described in detail since they would obscure the invention in unnecessary detail. Terms described below, which are defined considering functions in the present invention, can be different depending on user and operator's intention or practice. Therefore, the terms should be defined on the basis of the disclosure throughout this specification.

Embodiments of the present invention provide a technology for transmitting identification information of a small base station (BS) in a heterogeneous network. Here, the small BS, which is a low output BS installed within a macro cell, may be any one of at least a pico BS, a femto BS, a micro BS, and a radio relay station (RS).

The following description assumes that a wireless communication system provides a service using the Institute of Electrical and Electronics Engineers (IEEE) 802.16m standard. Accordingly, the wireless communication system provides a service using a frame of a structure illustrated in FIG. 2 below.

Figure 1:
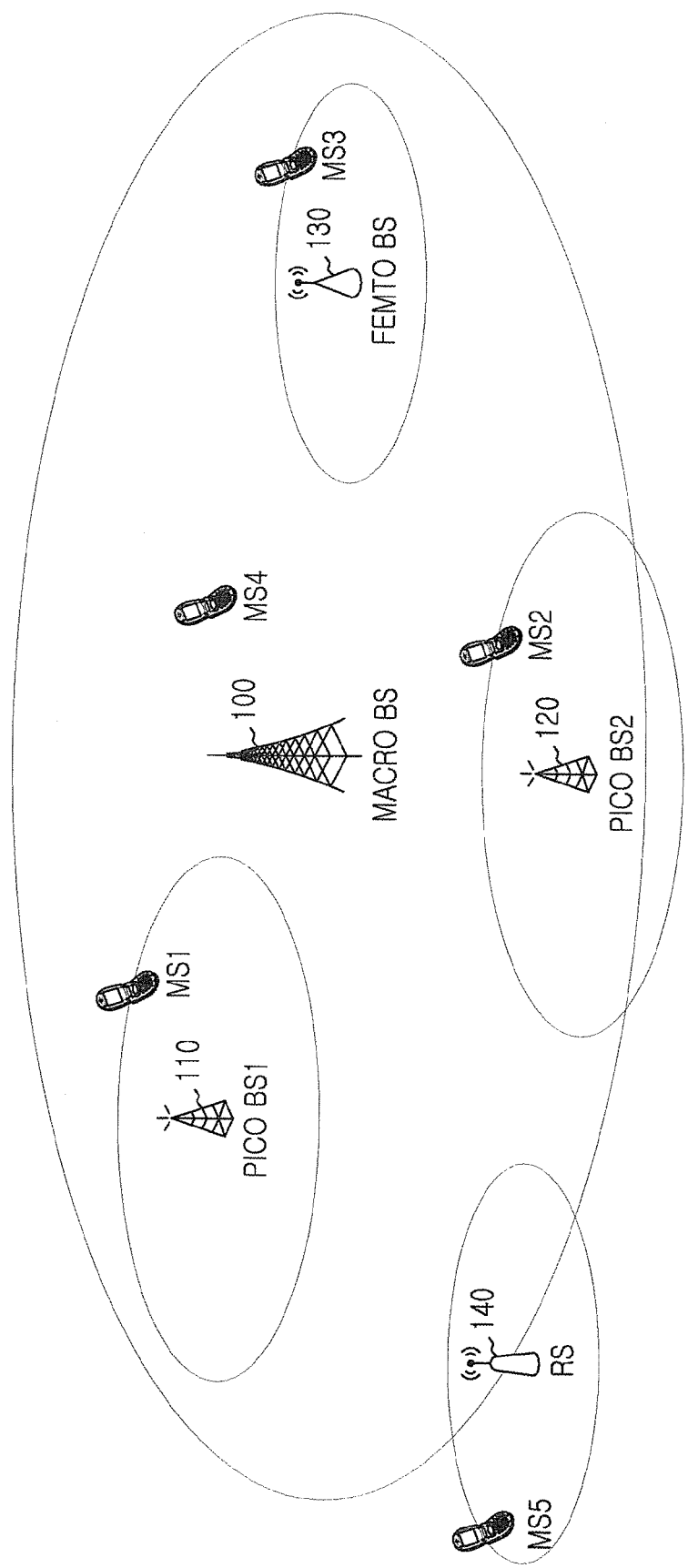
FIG. 1 is a diagram illustrating a construction of a heterogeneous network according to the conventional art.
Figure 2:
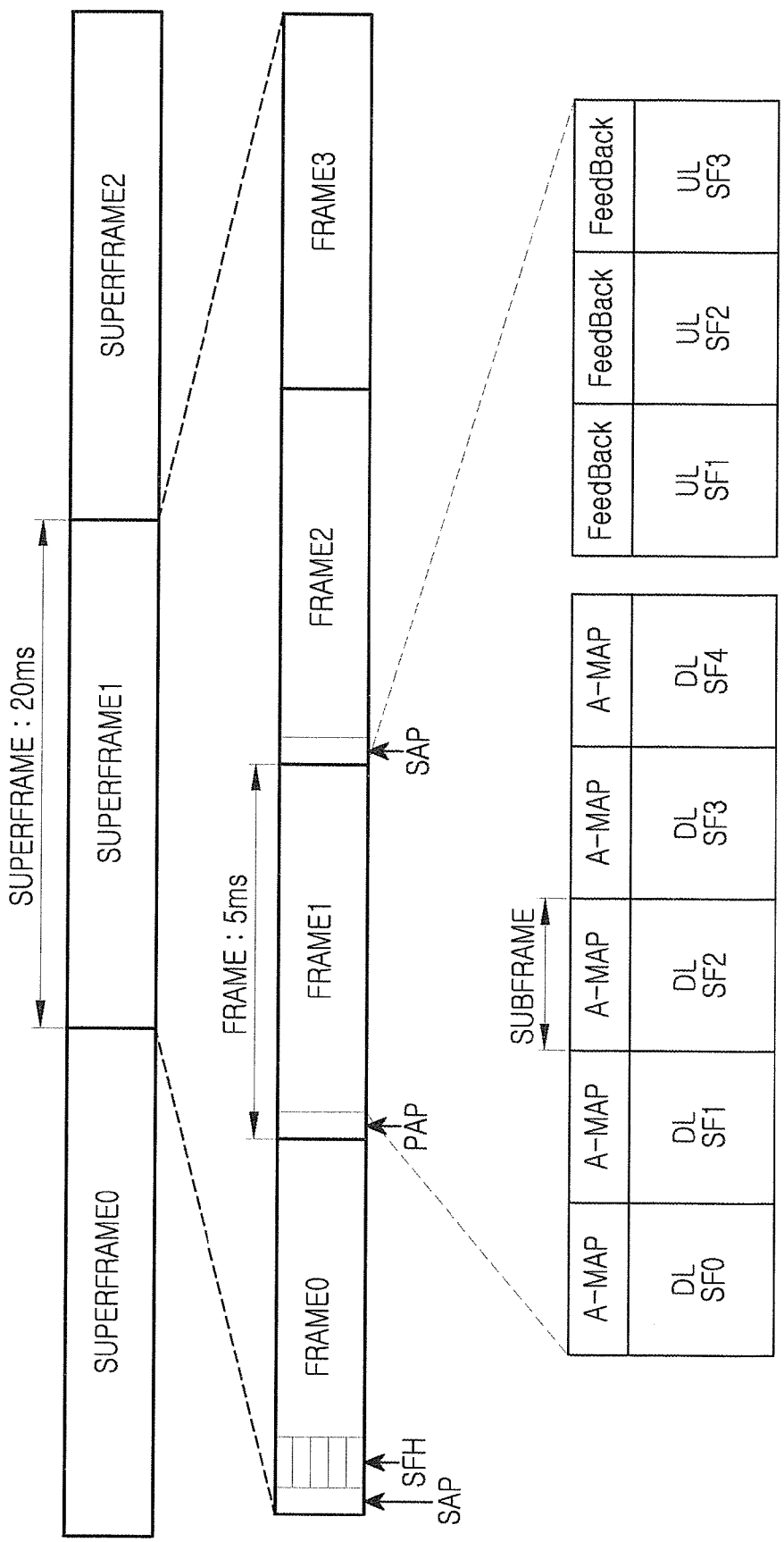
FIG. 2 is a diagram of a frame including a control channel according to the present invention.

FIG. 2 illustrates a structure of a frame including a control channel according to the present invention.

As illustrated in FIG. 2, the frame is of a hierarchical structure in which a superframe is composed of four frames and one frame is composed of eight subframes.

When providing a service using the frame constructed as above, a BS transmits a broadcasting control channel called a SuperFrame Header (SFH) through a first subframe of the superframe.

The BS transmits a Primary Advanced Preamble (PAP) representing synchronization and bandwidth information through a first symbol of a second frame constituting the superframe.

The BS transmits a Secondary Advanced Preamble (SAP) representing a cell identification sequence through a first symbol of an even-numbered frame constituting the superframe.

The BS transmits a unicast control channel called a MAP at every subframe.

The PAP is for providing bandwidth information without cell distinction, and does not cause interference between BSs within the same band. The SAP is for providing cell identification information and, as illustrated in FIG. 3 below, is transmitted in a structure of a frequency reuse three ('3') considering interference between neighboring cells.

Figure 3:
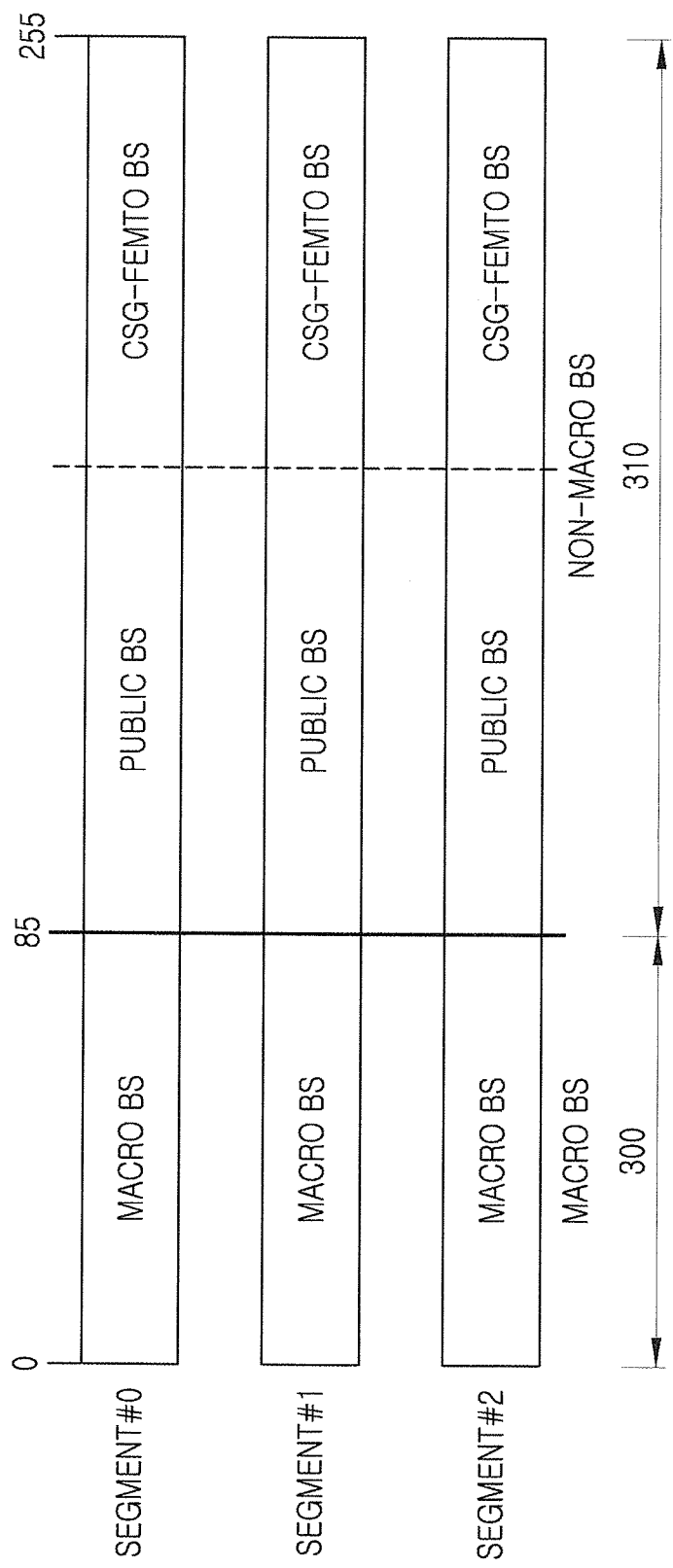
FIG. 3 is a diagram of a segment for transmitting identification information of a base station (BS) according an embodiment to the present invention.

FIG. 3 illustrates a construction of a segment for transmitting identification information of a BS according to the present invention. In the following description, a frequency resource divided for frequency reuse is called a segment.

As illustrated in FIG. 3, when a BS transmits a SAP in a form of a frequency reuse 3, the BS divides a frequency resource into three segments (Segment#0, Segment#1, and Segment#2). Accordingly, the BS transmits the SAP through any one segment among the three segments (Segment#0, Segment#1, and Segment#2). SAP sequences each transmitted through the segment are divided by BS type. For instance, in the IEEE 802.16m standard, eighty-six ('86') sequences 300 per each segment are allocated to a macro BS, and remnant sequences 310 are allocated to a non-macro BS (i.e., a small. BS). Here, the remnant sequences 310 may be divided into sequences for public small BSs and sequences for Closed Subscriber Group (CSG) small BSs.

When the BS transmits the SAP as above, a mobile station (MS) compares SAP symbol reception qualities for respective BSs and selects a serving cell. If a low output small BS uses the same segment as a high output macro BS, the MS has difficulty in selecting a cell of the small BS due to interference of a macro BS signal. Accordingly, the small BS transmits an SAP using a segment different from that of the macro BS as illustrated in FIG. 4 below.

Figure 4:
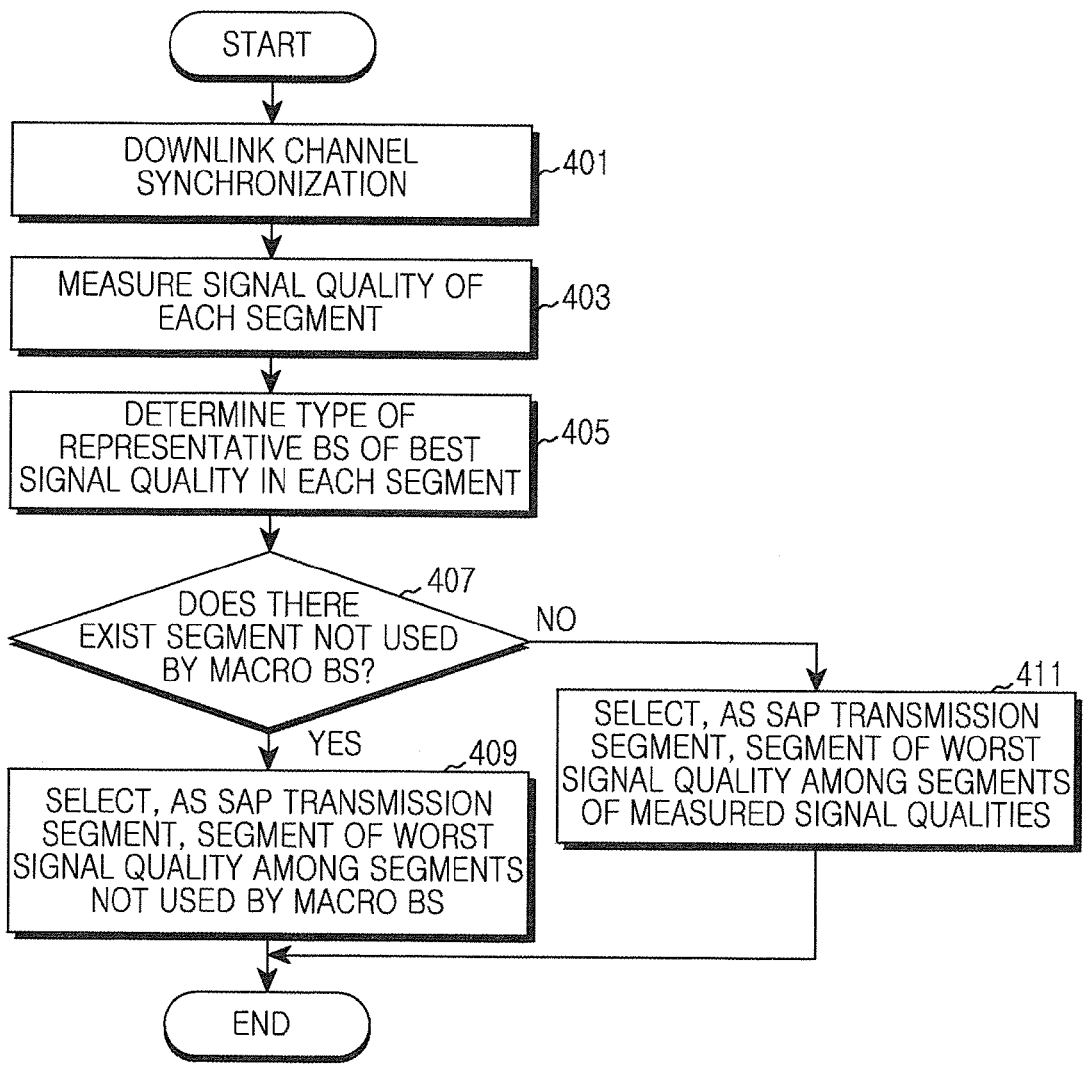
FIG. 4 illustrates a process for selecting a segment for transmitting identification information in a small BS according to an embodiment of the present invention.

FIG. 4 illustrates a process for selecting a segment for transmitting identification information in a small BS according to an embodiment of the present invention.

Referring to FIG. 4, in step 401, the small BS performs synchronization at a downlink channel that the small BS will use. At this time, the small BS acquires SAP transmission timing through the synchronization. Here, the synchronization includes symbol, frequency, and frame synchronization for receiving a downlink signal.

After acquiring the SAP transmission timing, the small BS proceeds to step 403 and measures a signal quality of each segment considering the SAP transmission timing. At this time, the small BS can recognize the signal quality of each segment as interference from a neighboring BS.

After measuring the signal quality of each segment, the small BS proceeds to step 405 and determines the type of a representative BS that has the best signal quality in each segment using SAP sequence division information. For example, SAP sequences of a segment are divided by BS type as illustrated in FIG. 3, so the small BS determines the BS type of a representative BS that has the best signal quality in each segment through SAP sequences of the representative BS.

Next, the small BS proceeds to step 407 and determines whether there is a segment not used by a macro BS. That is, the small BS determines whether representative BSs of all segments are macro BSs of macro cells overlapping with a service area of the small BS.

When it is determined in step 407 that there is a segment not used by the macro BS, the small BS recognizes that a signal strength from the macro BS is low. Accordingly, the small BS proceeds to step 409 and selects, as a segment for transmitting an SAP, a segment of the worst signal quality among at least one segment not used by the macro BS.

On the other hand, when it is determined in step 407 that there does not exist the segment not used by the macro BS, that is, when it is determined in step 407 that the representative BSs of all segments are the macro BSs, the small BS recognizes that a signal strength from the macro BS is high. Accordingly, the small BS proceeds to step 411 and selects, as a segment for transmitting an SAP, a segment of the worst signal quality among segments of measured signal qualities.

Next, the small BS terminates the algorithm according to an embodiment of the present invention.

In the aforementioned exemplary embodiment, after measuring a signal quality of each segment, a small BS determines the BS type of a representative BS of the each segment.

In another embodiment, a small BS may perform together a process of measuring a signal quality of each segment and a process of determining the BS type of a representative BS of the each segment. For instance, when the small BS recognizes a correlation value of an SAP sequence as a signal quality of a segment, the small BS recognizes a BS corresponding to an SAP sequence of the largest correlation value, as a representative BS of a corresponding segment.

Furthermore, in the aforementioned embodiment, when a small BS recognizes in step 407 that a signal strength from a macro BS is high, the small BS proceeds to step 411 and selects, as a segment for transmitting an SAP, a segment of the worst signal quality among segments of measured signal qualities.

In another embodiment, when a small BS recognizes in step 407 that a signal strength from a macro BS is high, the small BS compares the signal strength from the macro BS with the maximum reference value. If the signal strength from the macro BS is greater than the maximum reference value, the small BS may perform synchronization for a different carrier frequency so as to search a different frequency band. That is, the small BS proceeds to step 401 and acquires SAP transmission timing through synchronization for a downlink channel of a different carrier frequency.

Figure 5:
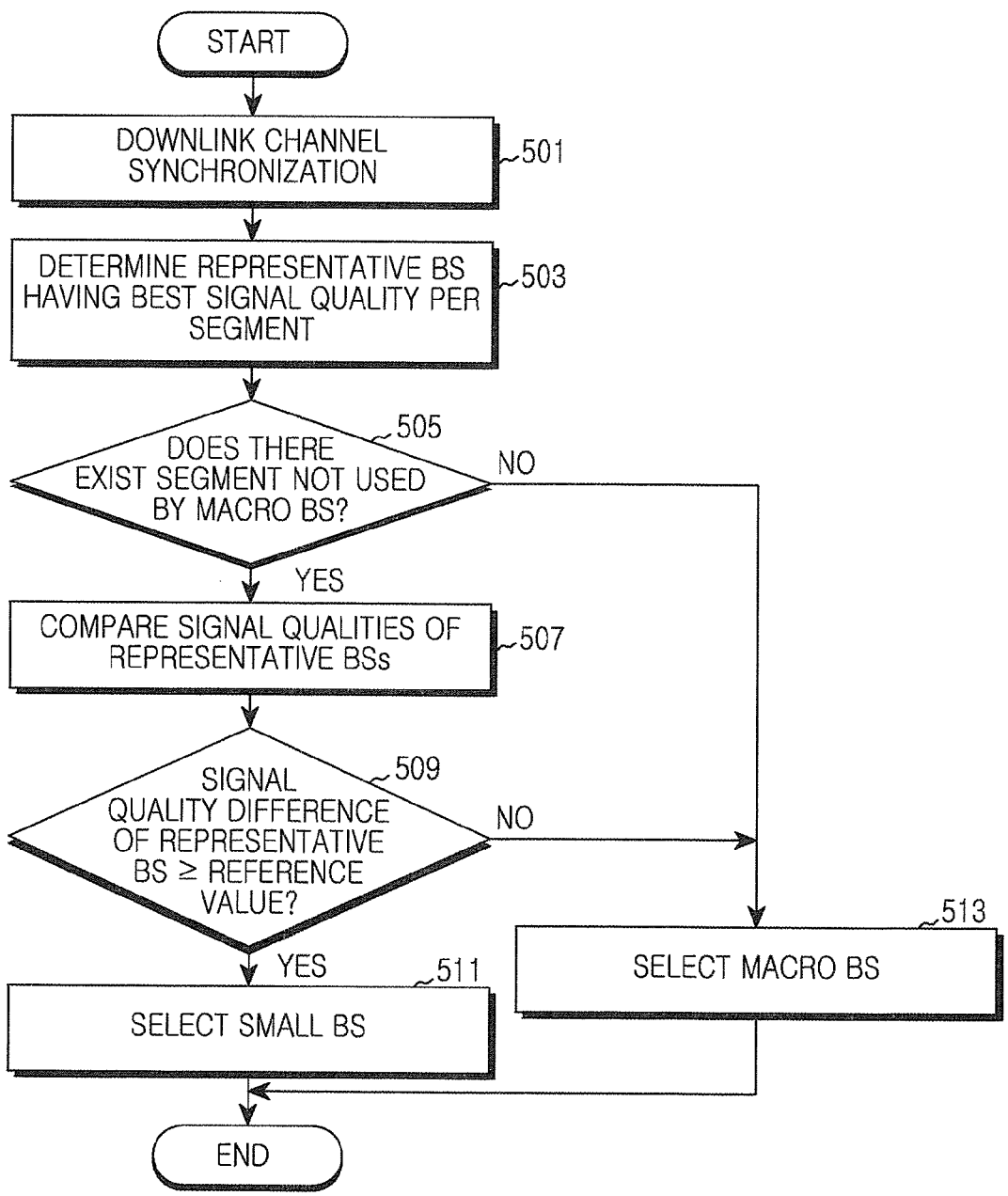
FIG. 5 illustrates a process for selecting a serving BS in a mobile station (MS) according to an embodiment of the present invention.

When a small BS transmits its own identification information using a segment different from that of a macro BS as above, an MS selects a serving cell as illustrated in FIG. 5 below.

FIG. 5 illustrates a process for selecting a serving BS in an MS according to an embodiment of the present invention.

Referring to FIG. 5, in step 501, the MS acquires an SAP symbol position through downlink channel synchronization.

After that, the MS proceeds to step 503 and receives an SAP symbol, determining a representative BS per segment. For instance, the MS detects a sequence of the best signal quality by segment and recognizes a BS corresponding to the detected sequence as a representative BS of a corresponding segment.

After determining the representative BS of each segment, the MS proceeds to step 505 and determines whether representative BSs of all segments are macro BSs.

When it is determined in step 505 that the representative BSs of all segments are the macro BSs, the MS proceeds to step 513 and selects a macro BS of the best signal quality, as a serving BS.

On the other hand, when it is determined in step 505 that there exists a segment whose representative BS is a non-macro BS, i.e., when it is determined in step 505 that there exists the segment whose representative BS is a small BS, the MS proceeds to step 507 and compares signal qualities between the representative BSs. For example, the MS compares signal qualities between representative BSs of different BS types. Accordingly, when a plurality of representative BSs are of the same BS type, the MS selects a representative BS of the best signal quality among the representative BSs of the corresponding BS type as a representative BS of the corresponding BS type and compares signal qualities between the representative BSs.

After that, the MS proceeds to step 509 and compares a difference of signal quality between representative BSs of different BS types with a reference value. Here, the reference value is used for determining a signal quality between an MS and a BS considering a difference of power between received signals transmitted at a different transmit power in a heterogeneous network.

When it is compared in step 509 that the difference of signal quality between the representative BSs of the different BS types is less than or is the same as the reference value, the MS recognizes that a distance with a small BS is short. Accordingly, the MS proceeds to step 511 and selects a small BS as a serving BS.

On the other hand, when it is compared in step 509 that the difference of signal quality between the representative BSs is greater than the reference value, the MS proceeds to step 513 and selects a macro BS as a serving BS.

Next, the MS terminates the algorithm according to an embodiment of the present invention.

In the aforementioned embodiment, when representative BSs of all segments are non-macro BSs, the MS selects, as a serving BS, a representative BS of the best signal quality among the representative BSs. At this time, although the representative BSs of all segments are non-macro BSs, when they are of the same BS type, the MS selects a representative BS of the best signal quality among the representative BSs of all segments, as a serving BS.

The following description is made for a construction of a small BS for determining a segment for transmitting its own identification information.

Figure 6:
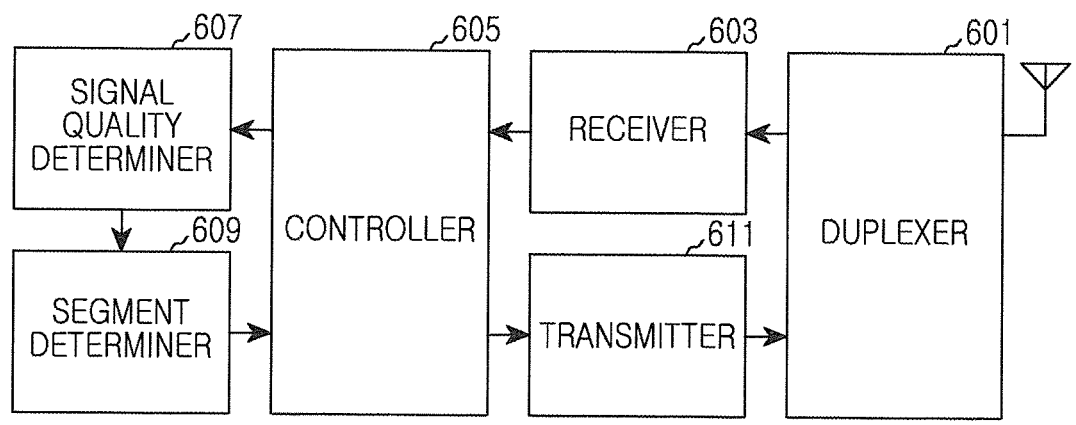
FIG. 6 is a block diagram of a small BS according to an embodiment of the present invention.

FIG. 6 is a block diagram of a small BS according to an embodiment of the present invention.

As illustrated in FIG. 6, the small BS includes a duplexer 601, a receiver 603, a controller 605, a signal quality determiner 607, a segment determiner 609, and a transmitter 611.

The duplexer 601 transmits a transmit signal provided from the transmitter 611 through an antenna according to a duplexing scheme, and provides a receive signal from the antenna, to the receiver 603.

The receiver 603 converts a radio frequency (RF) signal provided from the duplexer 601 into a baseband signal for demodulation. The receiver 603 can include an RF processing block, a demodulation block, a channel decoding block and the like. For example, the RF processing block converts an RF signal provided from the duplexer 601 into a baseband signal. The demodulation block is composed of a Fast Fourier Transform (FFT) operator for extracting data loaded on each subcarrier from a signal provided from the RF processing block and such. The channel decoding block is composed of a demodulator, a de-interleaver, a channel decoder and the like.

The controller 605 controls the general operation of the small BS. For example, the controller 605 controls to transmit an SAP through a segment determined in the segment determiner 609.

The signal quality determiner 607 measures a signal quality of each segment considering SAP transmission timing according to the control of the controller 605. For example, the signal quality determiner 607 measures a correlation value of an SAP sequence by each segment.

In consideration of a signal quality of each segment provided from the signal quality determiner 607, the segment determiner 609 selects a segment different from that of a macro BS as a segment for transmitting identification information of the small BS. For instance, the segment determiner 609 selects a segment for transmitting identification information of the small BS as illustrated in FIG. 4. That is, when there exists a segment whose representative BS is a non-macro BS, the segment determiner 609 selects, as a segment for transmitting an SAP, a segment of the worst signal quality among at least one segment not used by a macro BS. On the other hand, when representative BSs of all segments are macro BSs, the segment determiner 609 selects, as a segment for transmitting an SAP, a segment of the worst signal quality among segments of measured signal qualities.

The transmitter 611 encodes data to be transmitted to an MS and a control message, converts the data and control message into an RF signal, and transmits the RF signal to the duplexer 601. For example, the transmitter 611 can include a channel encoding block, a modulation block, an RF processing block and the like. Here, the channel encoding block is composed of a modulator, an interleaver, a channel encoder and the like. The modulation block is composed of an Inverse Fast Fourier Transform (IFFT) operator for mapping each subcarrier to a signal provided from the channel encoding block and the like. The RF processing block converts a baseband signal provided from the modulation block into an RF signal and outputs the RF signal to the duplexer 601.

In the aforementioned construction, the controller 605, a protocol controller, can perform the functions of the signal quality determiner 607 and the segment determiner 609. These are separately constructed in the present invention to distinguish and describe respective functions. Thus, in an actual realization, construction can be such that all or part of the functions is processed in the controller 605.

The following description is made for a construction of an MS for selecting a serving cell in consideration of a signal quality of identification information received from a BS.

Figure 7:
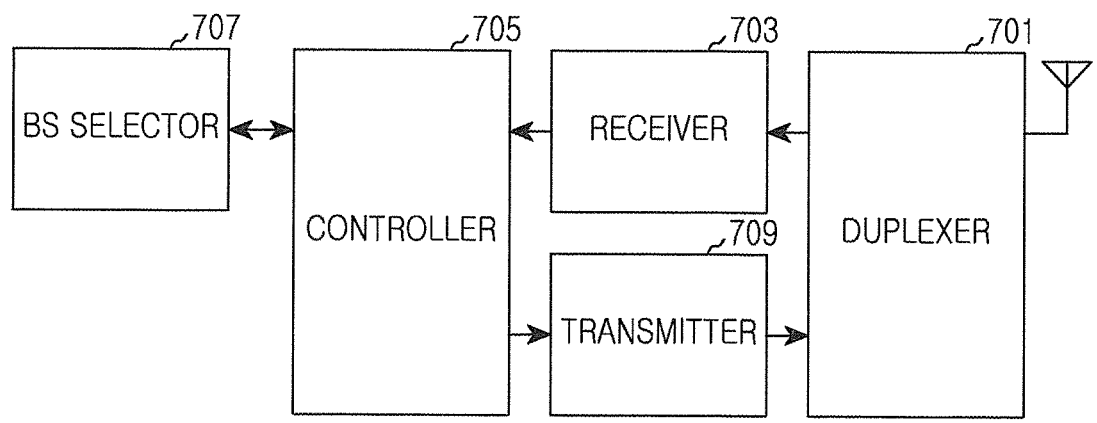
FIG. 7 is a block diagram of an MS according to an embodiment of the present invention.

FIG. 7 is a block diagram of an MS according to an embodiment of the present invention.

As illustrated in FIG. 7, the MS includes a duplexer 701, a receiver 703, a controller 705, a BS selector 707, and a transmitter 709.

The duplexer 701 transmits a transmit signal provided from the transmitter 709 through an antenna according to a duplexing scheme, and provides a receive signal from the antenna, to the receiver 703.

The receiver 703 converts an RF signal provided from the duplexer 701 into a baseband signal for demodulation. The receiver 703 can include an RF processing block, a demodulation block, a channel decoding block, and such. For example, the RF processing block converts an RF signal provided from the duplexer 701 into a baseband signal. The demodulation block is composed of an FFT operator for extracting data loaded on each subcarrier from a signal provided from the RF processing block and such. The channel decoding block is composed of a demodulator, a de-interleaver, a channel decoder, and such.

The controller 705 controls the general operation of the MS. For instance, the controller 705 transmits an SAP symbol position acquired through downlink channel synchronization, to the BS selector 707.

The BS selector 707 compares signal qualities for identification information of BSs according to the control of the controller 705 and selects a serving cell. For example, the BS selector 707 selects a serving cell as illustrated in FIG. 5. That is, when representative BSs of all segments are macro BSs, the BS selector 707 selects a macro BS of the best signal quality as a serving BS. At this time, although the representative BSs of all segments are non-macro BSs, when they are of the same BS type, the BS selector 707 selects a representative BS of the best signal quality as a serving BS. On the other hand, when there is a segment whose representative BS is a non-macro BS, that is, when there is a segment whose representative BS is a small BS, the BS selector 707 selects a serving cell considering a difference of signal quality between representative BSs. For instance, the BS selector 707 selects a serving cell considering a difference of signal quality between representative BSs of different BS types. If a plurality of representative BSs are of the same BS type, the BS selector 707 selects a representative BS of the best signal quality among the representative BSs of the corresponding BS type as a representative BS of the corresponding BS type.

The transmitter 709 encodes data to be transmitted to an MS and a control message, converts the data and control message into an RF signal, and transmits the RF signal to the duplexer 701. For example, the transmitter 709 can include a channel encoding block, a modulation block, an RF processing block, and such. Here, the channel encoding block is composed of a modulator, an interleaves, a channel encoder, and such. The modulation block is composed of an Inverse Fast Fourier Transform (IFFT) operator for mapping each subcarrier to a signal provided from the channel encoding block and such. The RF processing block converts a baseband signal provided from the modulation block into an RF signal and outputs the RF signal to the duplexer 701.

In the aforementioned construction, the controller 705, a protocol controller, can perform the function of the BS selector 707. These are separately constructed in the present invention to distinguish and describe respective functions. Thus, in an actual realization, construction can be such that all or part of the functions is processed in the controller 705.

As described above, embodiments of the present invention have an advantage of, by transmitting identification information of a small BS using a resource different from a resource used for a macro BS to transmit identification information, being capable of leading to a network capacity increase resulting from a resource reuse of a small scale cell because a service area of the small BS is secured in the small BS of a heterogeneous network.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for transmitting identification information in a small base station (BS) of a heterogeneous network, the method comprising:
   determining a signal quality of each of a plurality of segments;
   determining a representative BS having the best signal quality in each segment;
   determining a type of the representative BS;
   determining whether there exists a segment whose representative BS is not used by a macro BS;
   when at least one segment is not used by a macro BS, selecting a segment of the worst signal quality among the at least one segment that is not used by a macro BS; and
   transmitting the identification information using the selected segment,
   wherein the selected segment represents a resource for transmitting the identification information.

2. The method of claim 1, wherein the small BS is one of a pico BS, a femto BS, a micro BS, and a radio relay station (RS).

3. The method of claim 1, wherein determining the signal quality comprises measuring a correlation value of a sequence for each segment.

4. The method of claim 1, wherein the identification information comprises a Secondary Advanced Preamble (SAP).

5. The method of claim 1, further comprising:
   when representative BSs of all segments are macro BSs, selecting a segment of the worst signal quality among the segments; and
   transmitting the identification information using the selected segment.

6. The method of claim 1, wherein the small BS is one of a public small BS and a Closed Subscriber Group small BS.

7. The method of claim 1, wherein determining a signal quality comprises determining that a signal strength from a macro BS is high, and comparing the signal strength from the macro BS with a maximum reference value.

8. The method of claim 1, wherein determining the signal quality comprises determining when the strength from the macro BS is greater than the maximum reference value, and performing synchronization with a different carrier frequency to search a different frequency band.

9. The method of claim 1, prior to determining a signal quality, comprising:
   acquiring an SAP transmission timing through a synchronization process.

10. The method of claim 9, wherein determining a signal quality comprises using the SAP transmission timing.

11. An apparatus of a small base station (BS) for transmitting identification information in a heterogeneous network, the apparatus comprising:
    a receiver configured to receive a signal;
    a signal quality determiner configured to determine a signal quality of each of a plurality of segments of the received signal;
    a segment selector configured to determine a representative BS having the best signal quality in each segment, determine a type of the representative BS, and determine whether there exists a segment whose representative BS is not used by a macro BS, and further configured to, when at least one segment is not used by a macro BS among the plurality of segments, select a segment of the worst signal quality among the at least one segment; and
    a transmitter configured to transmit the identification information using the selected segment,
    wherein the selected segment represents a resource for transmitting the identification information.

12. The apparatus of claim 11, wherein the small BS is one of a pico BS, a femto BS, a micro BS, and a radio relay station (RS).

13. The apparatus of claim 11, wherein the signal quality determiner is further configured to measure a correlation value of a sequence for each segment.

14. The apparatus of claim 11, wherein the identification information comprises a Secondary Advanced Preamble (SAP).

15. The apparatus of claim 11, wherein the segment determiner is further configured to select a segment of the worst signal quality among the plurality of segments when representative BSs of all segments are macro BSs.

16. The apparatus of claim 11, wherein the small BS is one of a public small BS and a Closed Subscriber Group small BS.

17. The apparatus of claim 11, wherein the signal quality determiner is configured to compare the signal strength from the macro BS with a maximum reference value when a signal strength from the macro BS is high.

18. The apparatus of claim 11, wherein when the signal strength from the macro BS is greater than the maximum reference value, the small BS performs synchronization with a different carrier frequency to search a different frequency band.

19. The apparatus of claim 11, wherein the receiver is further configured to acquire an SAP transmission timing through a synchronization process.

20. The apparatus of claim 11, the signal quality determiner is configured to determine a signal quality using the SAP transmission timing.

* * * * *